(12) United States Patent
Albrecht

(10) Patent No.: US 11,440,122 B2
(45) Date of Patent: Sep. 13, 2022

(54) ACCESSORY AND KIT FOR WELDING AND CUTTING DEVICES

(71) Applicant: Martin Albrecht, Lakewood, OH (US)

(72) Inventor: Martin Albrecht, Lakewood, OH (US)

( * ) Notice: Subject to any disclaimer, the term of this patent is extended or adjusted under 35 U.S.C. 154(b) by 360 days.

(21) Appl. No.: 16/829,602

(22) Filed: Mar. 25, 2020

(65) Prior Publication Data
US 2020/0238428 A1 Jul. 30, 2020

Related U.S. Application Data

(63) Continuation-in-part of application No. 14/867,058, filed on Sep. 28, 2015, now abandoned.

(60) Provisional application No. 62/179,614, filed on May 14, 2015.

(51) Int. Cl.
*B23K 9/28* (2006.01)
*B23K 9/32* (2006.01)

(52) U.S. Cl.
CPC . *B23K 9/28* (2013.01); *B23K 9/32* (2013.01)

(58) Field of Classification Search
CPC ...... B23K 37/0205; B23K 9/126; B23K 9/28; B23K 9/287; B23K 9/32
See application file for complete search history.

(56) References Cited

U.S. PATENT DOCUMENTS

| | | | | |
|---|---|---|---|---|
| 1,944,125 A | * | 1/1934 | Halbing | B23K 37/0205 266/74 |
| 4,734,991 A | * | 4/1988 | Bettino | B23K 37/0205 266/66 |
| 5,804,133 A | * | 9/1998 | Denton | B23K 7/102 266/70 |

* cited by examiner

*Primary Examiner* — Dana Ross
*Assistant Examiner* — Joe E Mills, Jr.
(74) *Attorney, Agent, or Firm* — Brennan, Manna & Diamond, LLC

(57) ABSTRACT

A welding accessory that allows a welder to easily maintain the proper electrical arc gap between the welding torch and the surface being welded, and that improves the consistency of the shield gas plume by reducing the variation of gap between the shield gas nozzle and the surface being welded while in motion is disclosed. In a preferred embodiment, the welding accessory is comprised of a body portion, a slidable and rotatable repositionable arm; and a wheel attached to one end of said repositionable arm. A kit that comprises the welding accessory of the present invention and other accessories for welding and/or oxy-fuel cutting is also disclosed.

20 Claims, 5 Drawing Sheets

ACCESSORY AND KIT FOR WELDING AND CUTTING DEVICES

CROSS-REFERENCE

This application is a continuation in part of Non-Provisional patent application Ser. No. 14/867,058 filed on Sep. 28, 2015, which claims priority from Provisional Patent Application Ser. No. 62/179,614 filed on May 14, 2015.

FIELD OF THE INVENTION

This invention relates to an accessory and a kit for use with a welding and/or cutting device.

BACKGROUND

Metal inert gas welding, or MIG welding, is well known in the art and is a welding process in which an electric arc forms between a consumable wire electrode and the work piece metal(s), which heats the work piece metal(s), causing them to melt, and join. Along with the wire electrode, a shielding gas feeds through the welding gun, which shields the process from contaminants in the air.

Heretofore, a welder performing a MIG welding operation had to maintain by hand the proper shield gas plume and electric arc gap while also attempting to move the welding device fluidly and continuously to achieve a proper and acceptable welding bead, which could take years of experience to achieve on a consistent basis. Stated differently, heretofore, it has been difficult for novice and even semi-experienced welders to achieve an acceptable bead and weld on a consistent basis, which can be both frustrating and time consuming for a welder or welding technician attempting to learn the craft and lead to inconsistent results.

Oxy-fuel cutting is also a process that is well known in the art and involves using a torch, fuel gases and oxygen to cut metals. More specifically, in oxy-fuel cutting, a torch is used to heat metal to its kindling temperature. A stream of oxygen is then trained on the metal, burning it into a metal oxide that flows out of the kerf as slag. Similar to MIG welding, heretofore, it has been difficult for a novice welder or welding technician to make precision cuts using an oxy-fuel torch due to the need to continuously and fluidly move the cutting torch along the piece of metal being cut.

Consequently, there is a long felt need in the art for a welding accessory that allows the welder to easily maintain the proper electrical arc gap between the torch and the metal surface, and that improves consistency of the shield gas plume by reducing the variation of gap between the shield gas nozzle and the metal surface while in motion. There is also a long felt need in the art for a welding accessory that improves the consistency of the bead and the weld by providing the welder with a means for more concisely and fluidly moving the torch along a desired weld path. Finally, there is a long felt need in the art for a welding kit that comprises a plurality of welding/cutting accessories that enable the welder to accomplish all of the forgoing objectives in a MIG welding or oxy-fuel cutting operation, and that is relatively inexpensive to manufacture and safe and easy to use.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed herein, in one aspect thereof, is a welding accessory device for: (i) enabling a welder user to easily maintain the proper electrical arc gap between the welding torch and the metal surface, and that improves consistency of the shield gas plume by reducing the variation of gap between the shield gas nozzle and the metal surface while in motion; and (ii) that improves the consistency of the bead and the weld by providing the welder with a means for more concisely and fluidly moving the torch along a desired weld or cutting path.

In a preferred embodiment of the present invention, the welding accessory device comprises a body portion, a repositionable arm having a first end and a second end, and a rotatable wheel positioned along said second end of said arm, as described more fully below. Also disclosed is a kit comprised of the above described welding accessory device and other welding/cutting accessories that enable the welder to accomplish all of the forgoing objectives, as well as others, in a MIG welding or oxy-fuel cutting operation, and that is relatively inexpensive to manufacture and safe and easy to use.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 3A is a side perspective view of the block of the welding accessory device of FIG. 1.

DETAILED DESCRIPTION

Figure 1:
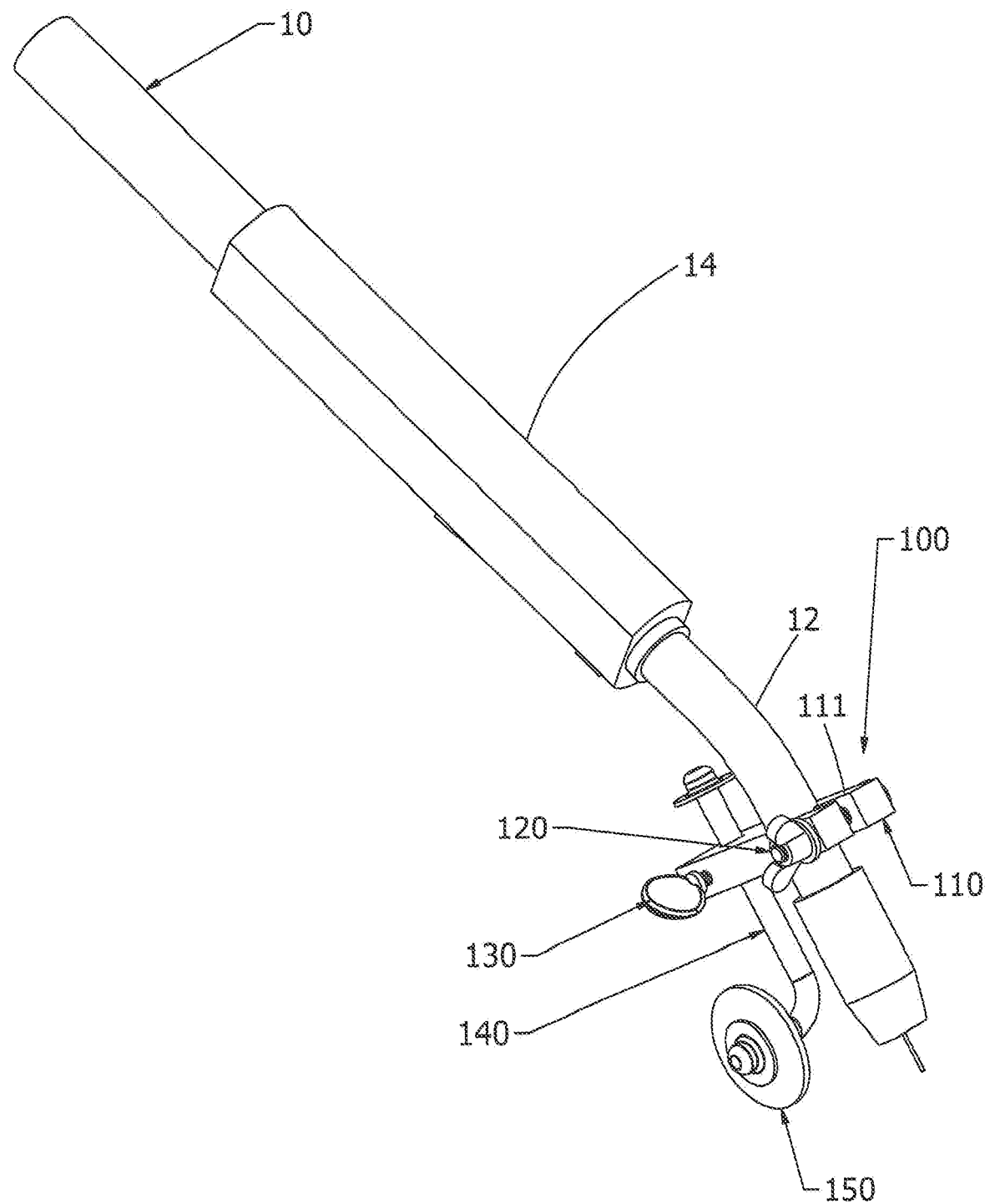
FIG. 1 is a perspective view of one embodiment of the welding accessory device of the present invention securely attached to an end of a MIG welder.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details.

Referring initially to the drawings, FIG. 1 depicts a perspective view of the welding accessory device 100 of the present invention securely attached to a MIG welder 10.

More specifically, MIG welder 10 is comprised of a head portion 12 and handle portion 14, and device 100 is removably and repositionably attached to head portion 12.

Device 100 is preferably comprised of a body portion 110, a fastener 120, a set screw 130, an arm portion 140 and a wheel 150. Unless otherwise stated herein, device 100 is preferably comprised of durable materials, such as steel, aluminum, heat resistant plastic or other material capable of being exposed to elevated temperatures due to the proximity of device 100 to MIG welder 10.

Figure 2:
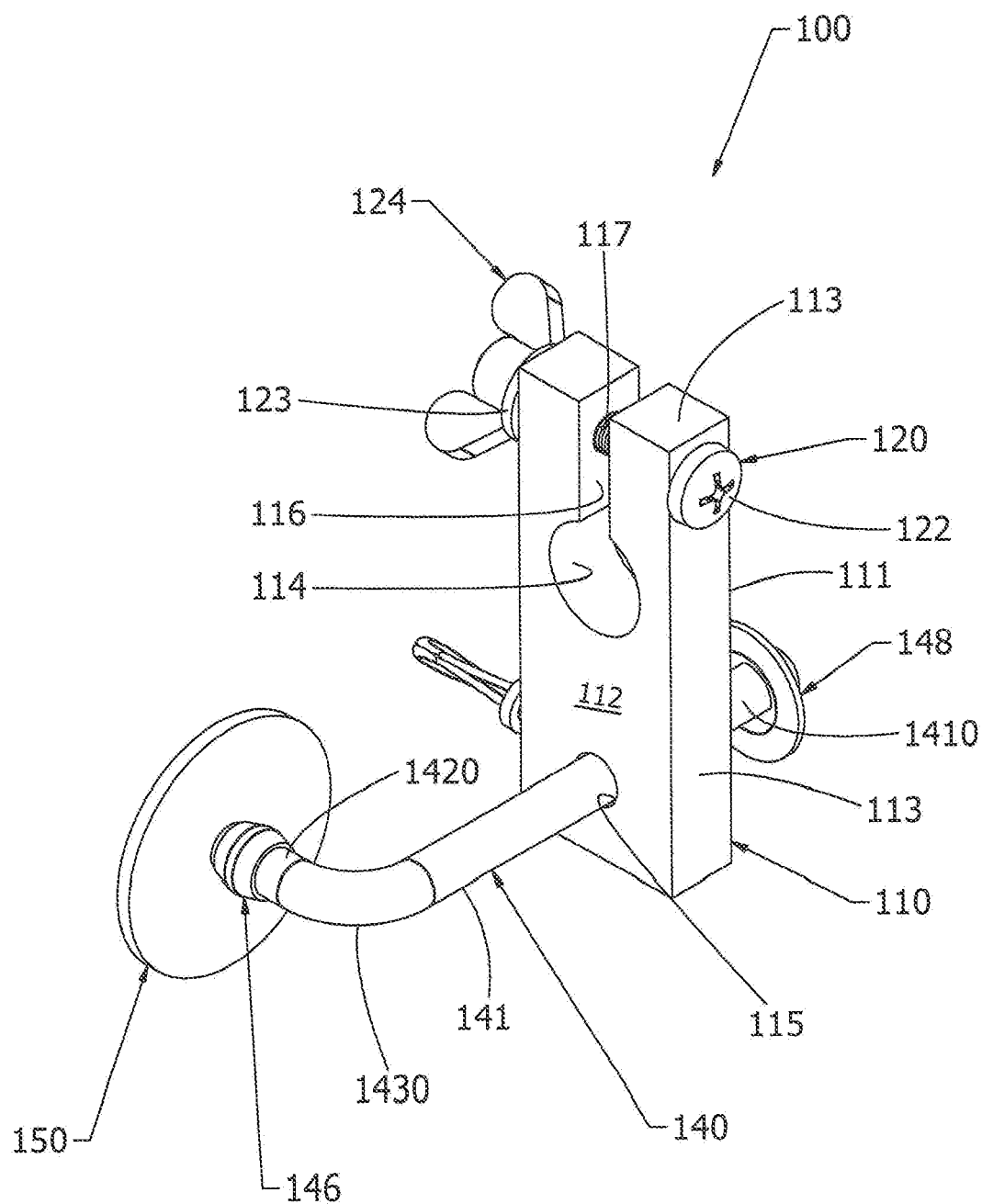
FIG. 2 is a perspective view of the welding accessory device of FIG. 1.
Figure 3:
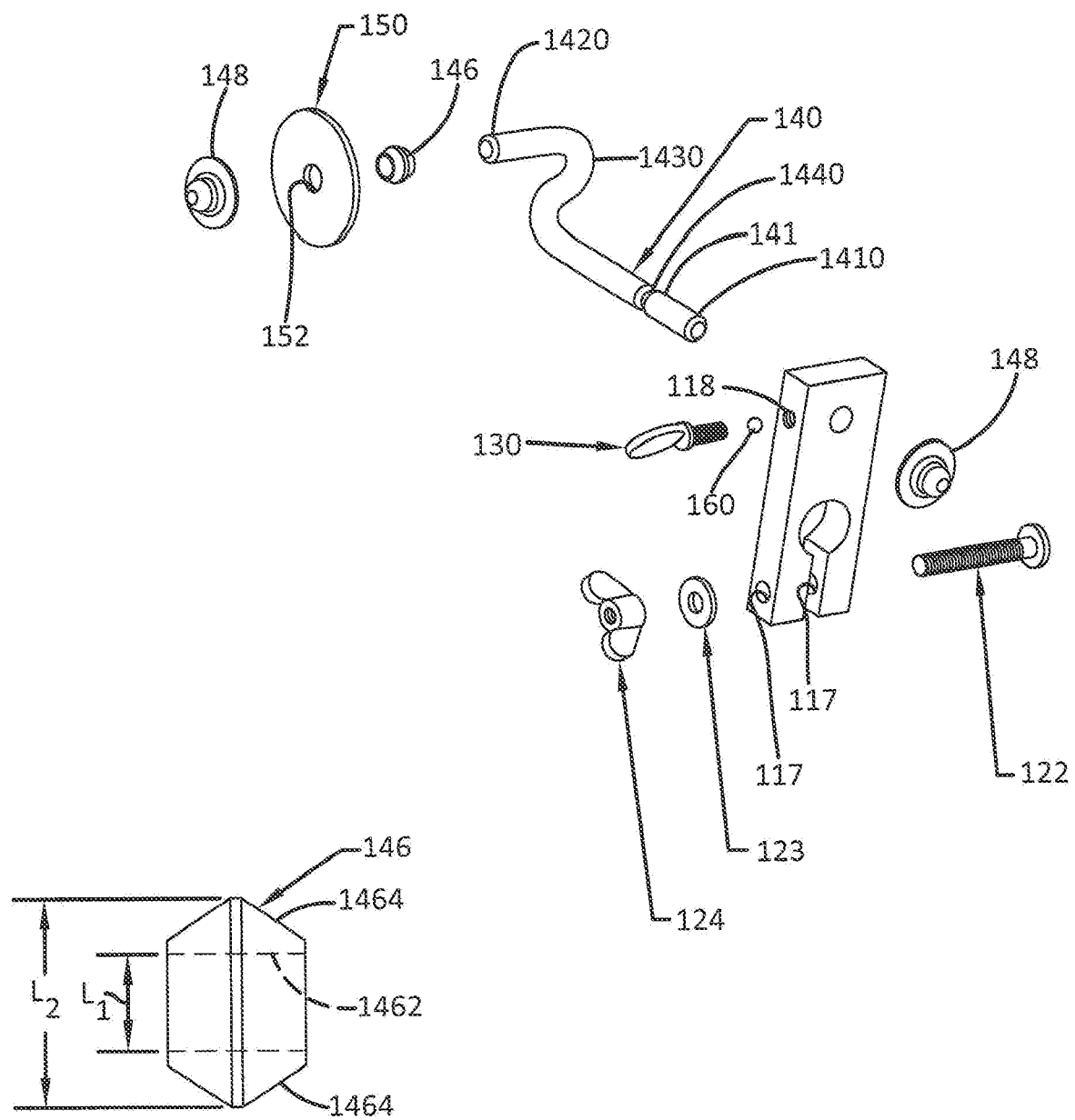
FIG. 3 is an exploded view of a welding accessory device of the present invention and having a caster like arm portion with a ball bearing groove or race formed therein.

As best shown in FIGS. 2 and 3, body portion 110 is preferably comprised of an inboard surface 111, an outboard surface 112, a plurality of sides 113, a first continuous opening 114, a second continuous opening 115, a slot 116, a fastener opening 117 and an arm fastener opening 118. Inboard surface 111 refers to the surface of body portion 110 facing towards the handle portion 14 of MIG welder 10 when device 100 is properly installed on head portion 12, as shown in FIG. 1. Outboard surface 112 refers to the surface of body portion 110 opposite of inboard surface 111 and facing in the opposite direction of handle portion 14 of MIG welder 10 when device 100 is properly installed on head portion 12, as shown in FIG. 1.

More specifically, first continuous opening 114 extends between inboard surface 111 and outboard surface 112 and is shaped and sized accordingly to receive head portion 12 of MIG welder 10. Similarly, second continuous opening 115 also extends between inboard surface 111 and outboard surface 112 and is shaped and sized accordingly to receive arm portion 140, as described more fully below. As referenced above, body portion 110 is also preferably comprised of slot 116 that extends between said inboard surface 111 and said outboard surface 112, as well as between first continuous opening 114 and one of said plurality of sides 113, as best shown in FIG. 2. As more fully explained below, the width of slot 116 is adjustable by tightening/loosening fastener 120, and slot 116 is useful for installing/removing device 100 from head portion 12 of MIG welder 10.

As best illustrated in FIG. 2, fastener opening 117 preferably extends through body portion 110 from one side 113, across slot 116, to a second opposing side 113 and is sized and shaped accordingly to receive fastener 120, as more fully explained below. In a preferred embodiment of the present invention, fastener opening 117 is not threaded, though it is contemplated that fastener opening 117 could also be threaded without affecting the overall scope of the present invention.

As best illustrated in FIGS. 2 and 3, arm fastener opening 118 is located on a select side 113 of body portion 110 and extends to second continuous opening 115, wherein arm portion 140 typically resides. In a preferred embodiment of the present invention, arm fastener opening 118 is threaded and is sized and shaped accordingly to receive set screw 130, as described more fully below.

Fastener 120 may be any fastener commonly known in the art and is preferably comprised of a threaded screw 122, a washer 123 and a nut 124, such as a wing nut for easy handling. Notwithstanding, as mentioned above, if fastener opening 117 is threaded, washer 123 and nut 124 may be eliminated and fastener 120 may simply be screwed into fastener opening 117. As explained more fully below, fastener 120 is useful for slightly increasing or decreasing the size of first continuous opening 114 and slot 116 to install/remove device 100 from head portion 12 of MIG welder 10, and for removably securing device 100 to head portion 12.

Screw 130 may be any fastener commonly known in the art, but is preferably a set screw. Screw 130 is inserted into arm fastener opening 118 in side 113 of body portion 110 and extends to second continuous opening 115, wherein arm portion 140 typically resides. As explained more fully below, screw 130 is useful for securing arm portion 140 in a desired position relative to body portion 110 and MIG welder 10, both longitudinally and rotatably.

As best shown in FIG. 2, arm portion 140 is preferably comprised of an elongated member 141, a block 146, and caps 148. More specifically, elongated member 141 extends through second continuous opening 115, and may be comprised of a first end 1410, an opposing second end 1420 and a bend 1430 located along the length of elongated member 141 and between said first end 1410 and said second end 1420, as best shown in FIG. 2. A first cap 148 is attached to said first end 1410 to prevent arm portion 140 from being prematurely removed from second continuous opening 115. Block 146 and a second cap 148 are positioned along and removably attached to said second end 1420 of elongated member 110, with wheel 150 also positioned along the second end 1420 of elongated member 110 between said block 146 and second cap 148, as more fully described below. Block 146 and second cap 148 prevent wheel 150 from being prematurely removed from elongated member 141, but do not prevent the rotation of wheel 150 about elongated member 141 including, without limitation, in a non-linear, wobbly motion on account of the unique shape of block 146 and the amount of spacing between block 146 and second cap 148.

As best shown in FIG. 3, arm portion 140 may comprise a series of bends 1430 (as opposed to a single bend as is shown in FIG. 2) that form a caster like assembly near second end 1420, and a groove or ball bearing race 1440 formed in elongated member 141 near first end 1410 for receipt of a ball bearing 160, as explained more fully below. The presence of the series of caster like bends 1430 enable the orientation of wheel 150 (i.e., direction of proposed travel) to remain in substantially the same two dimensional plane as the longitudinal axis of the straight portion of elongated member 141 (i.e., closer to first end 1410). Further, the combination of (a) the caster like bends 1430, (b) the unique features of the block 146 described below, (c) the presence of ball bearing 160 in race 1440, and (d) the rotatable nature of arm portion 140 about its longitudinal axis (i.e., the longitudinal axis of the straight portion closest to first end 1410), enable the device 100 to travel smoothly across any surface and in any direction in a free flow like manner.

As stated above, a groove or ball bearing race 1440 may also be formed in elongated member 141 near first end 1410 for receipt of a ball bearing 160, as shown in FIG. 3. More specifically, ball bearing 160 may be inserted into arm fastener opening 118 prior to the installation of thumb screw 130 such that ball bearing 160 is rotatably positioned within ball bearing race 1440 and retained in opening 118 by the presence of screw 130. The presence of ball bearing 160 within ball bearing race 1440 serves at least the following two purposes: (a) it prevents the longitudinal movement of arm 140 relative to body portion 110, which allows the head portion 12 of MIG welder 10 to maintain a desired distance from the workpiece; and (b) it permits the user to selectively permit/prohibit rotation of arm 140 within body portion 110. More specifically, the user may permit rotation by slightly loosening or backing off thumb screw 130 so that it is not applying undue pressure on ball bearing 160. Likewise, the user may prohibit rotation by tightening down on thumb screw 130 so as to prevent ball bearing 160 from operating within ball bearing race 1440.

Wheel 150 may be any wheel commonly known in the art and is comprised of a continuous opening 152 therein for receipt of a portion of elongated member 141. More specifically, wheel 150 is positioned along and rotates about said second end 1420 of elongated member 141 and between block 146 and second cap 148. As noted above, wheel 150 is permitted to wobble as it rotates about elongated member 141 because of the unique and tapered shape of block 146, and the amount of spacing between block 146 and second cap 148.

FIG. 3A is a side perspective view of the block 146 of the welding accessory device 100. Block 146 is comprised of a continuous opening 1462 therein for receipt of a portion of elongated member 141, and a plurality of tapered portions 1464. As best shown in FIG. 3A, the continuous opening 1462 has a diameter of L1, and block 146 has an overall length of L2. As an important feature of the device 100 of the present invention, the diameter of the continuous opening 152 in wheel 150 is greater than L1, but less than L2, which means that the tapered portions 1464 of block 146 will interact with wheel 150 and cause wheel 150 to wobble during its rotation about second end 1420 of elongated member 141 and between block 146 and second cap 148. The wobble effect, combined with the other unique characteristics described above, enables the device 100 to travel smoothly across any surface and in any direction in a free flow like manner, and also enables the device 100 to track (i.e., follow-along) a corner formed by, for example, the intersection of a horizontal surface and a vertical surface.

It is also contemplated that welding accessory device 100 can be combined with other welding and/or oxy-fuel cutting accessories to form a kit that is useful to both professional and novice welders. More specifically, device 100 may be combined with a cutting wheel device 200 and a torch clamp 300.

Figure 4:
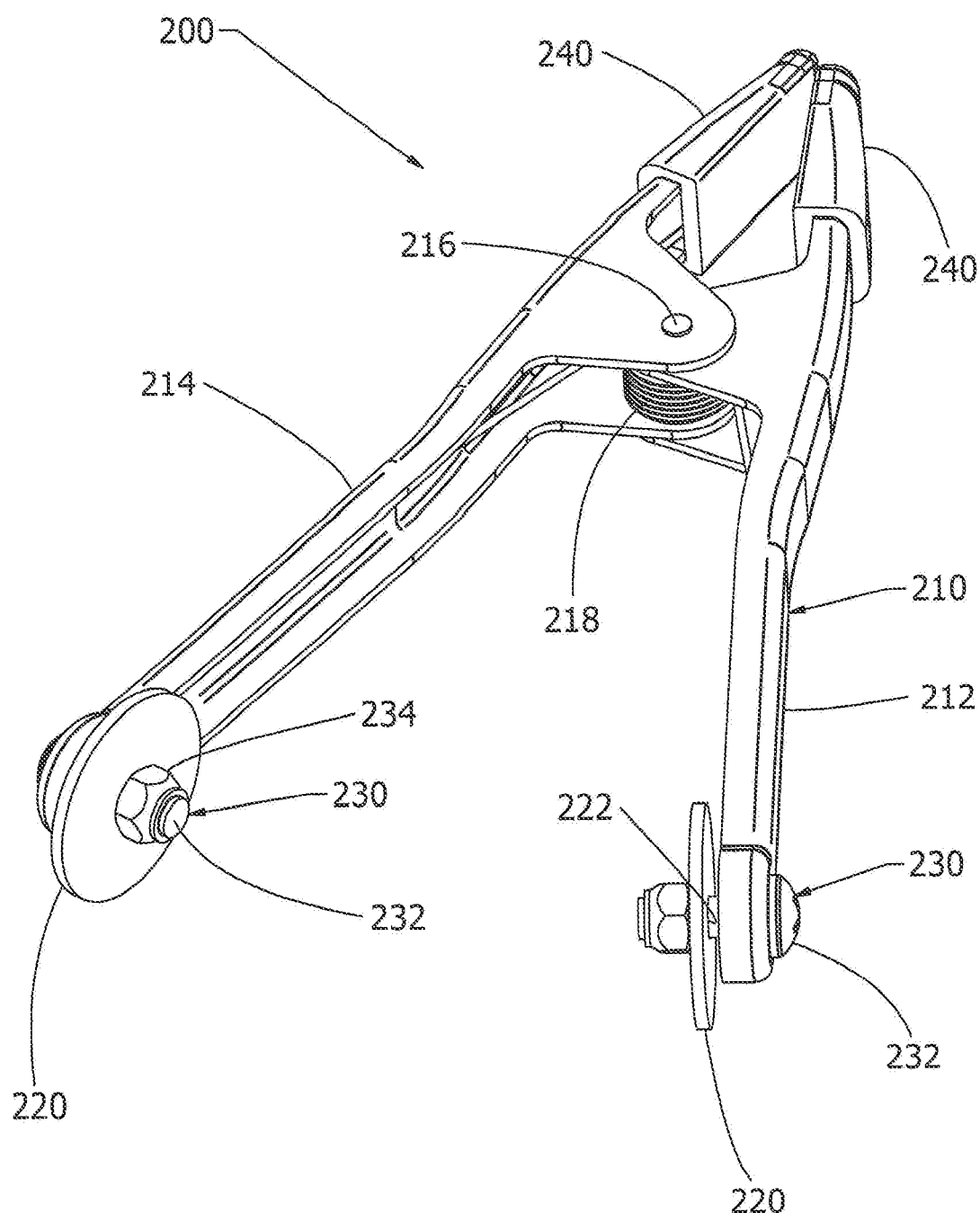
FIG. 4 is a perspective view of one embodiment of an additional accessory device of the kit of the present invention.

Cutting wheel device 200 is preferably comprised of a clamp 210, wheels 220, fasteners 230 and protective covers 240. More specifically, and as shown in FIG. 4, clamp 210 may be any type of clamp commonly known in the art and is comprised of a first arm 212, a second arm 214, an axle 216 connecting said first arm 212 to said second arm 214, and a spring 218 that is positioned along said axle 216 between said first and second arms 212, 214. Spring 218 is in tension and causes a common end of each of said first arm 212 and said second arm 214 to be in contact with one another (the clamping portion) when said clamp 210 is not in use. A wheel 220 with an opening 222 therein is attached to the opposite end of each of said first arm 212 and said second arm 214 via fasteners 230, as best shown in FIG. 4. Fasteners 230 may be any type of fastener commonly known in the art, but is preferably comprised of a screw 232 that passes through an opening in a respective one of said first arm 212 or second arm 214 as well as opening 222, and one or more nuts 234 to secure wheel 220 to clamp 210. Notwithstanding, each of said wheels 220 rotate about one of said screws 232 and extends beyond the end of said respective first and second arms 212, 214. In this manner, cutting wheel device 200 may be clamped to, for example, an oxy-fuel cutting device (not shown) and rolled along a surface to be cut (also not shown) to provide a precise and consistent cut to said surface. In order to protect said cutting device and the clamping ends of said first arm 212 and said second arm 214, it is also contemplated that a protective cover 240 may be placed on the clamping end of first arm 212 and second arm 214 as shown in FIG. 4.

Figure 5:
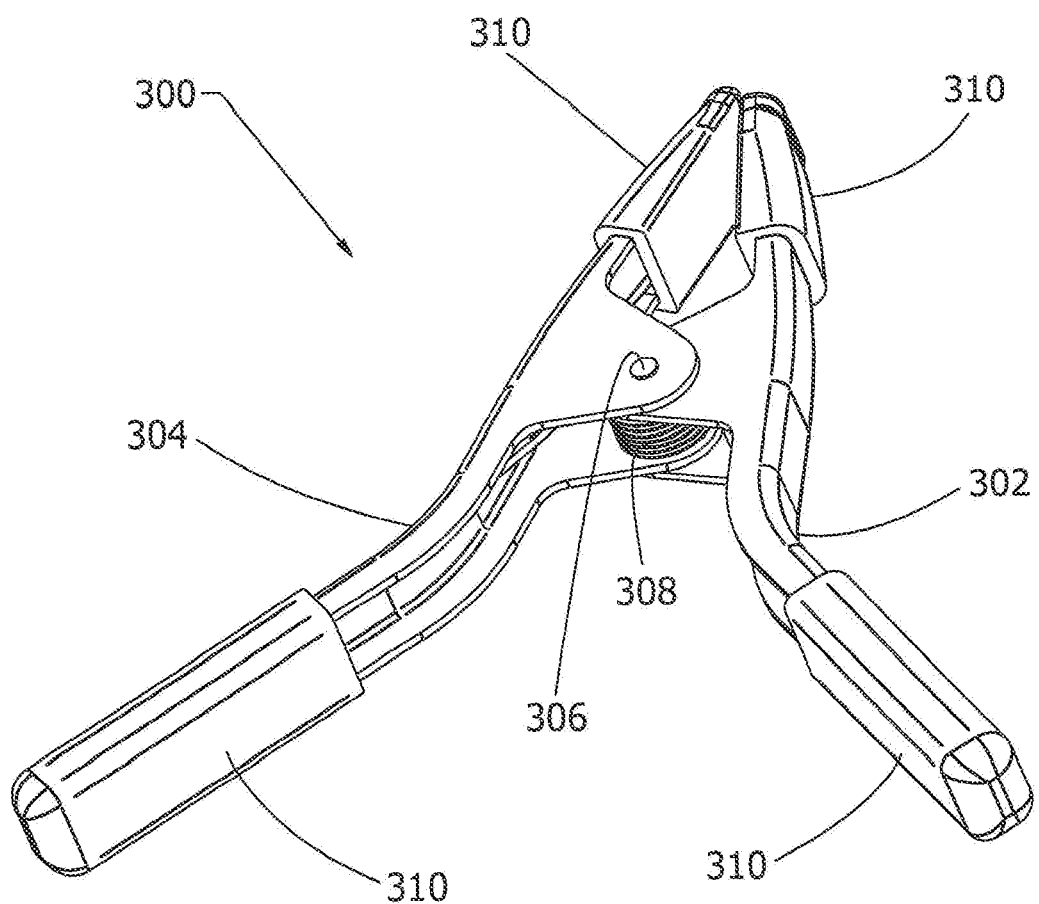
FIG. 5 is a perspective view of one embodiment of an additional accessory device of the kit of the present invention.

As best shown in FIG. 5, torch clamp 300 may be any type of clamp commonly known in the art and is preferably comprised of a first arm 302, a second arm 304, an axle 306 connecting said first arm 302 to said second arm 304, and a spring 308 that is positioned along said axle 306 between said first and second arms 302, 304. Spring 308 is in tension and causes a common end of each of said first arm 302 and said second arm 304 to be in contact with one another (the clamping portion) when said clamp torch clamp is not in use. Torch clamp 300 may be used to support, for example, an oxy-fuel cutting device or other welding tool above a surface when not in use by clamping said torch clamp 300 to said welding or cutting device and inverting said torch clamp 300 such that the portion of first arm 302 and second arm 304 furthest away from said clamped cutting or welding device (i.e., the non-clamping side of torch clamp 300) may be placed on the resting surface (not shown) with said welding or cutting device positioned above and away from said resting surface. In this manner, a welder or other technician may temporarily store/support said welding or cutting torch without having to shut off the same, thereby temporarily freeing both hands of the welder or technician to perform other tasks.

Having now described the general structure of a preferred embodiment of device 100, as well as the other accessories that comprise the kit, its function will now be described in general terms. A welder or technician (not shown) desiring to improve the consistency of a bead and weld may attach device 100 to a welding device, such as MIG welder 10, by placing the head portion 12 into opening 114, rotating said device 100 about said head portion 12 into a desired position, and tightening fastener 120 to secure device 100 to welding device 10. The welder may then loosen set screw 130 thereby enabling the welder (not shown) to reposition the arm portion 140 (and, therefore, wheel 150) longitudinally and/or rotatably into a desired position relative to head portion 12 of MIG welder 10. Once arm portion 140 and wheel 150 are in a desired position and orientation relative to head portion 12, the welder or other technician may tighten the set screw 130 against said arm portion 140 to lock the same in place. In this manner, a welder or other technician can position said wheel 150 to roll about a surface to be cut or welded in a consistent manner, while also maintaining a relatively constant distance between MIG welder 10 and said surface.

Other variations are also within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A welding accessory device comprising:
   a body portion;
   a repositionable arm comprised of a first end with a longitudinal axis, a second end, and a ball bearing race;
   a ball bearing positioned within the body portion and adjacent to the ball bearing race;
   a block;
   a first cap attached to the first end of the repositionable arm and a second cap attached to the second end of the repositionable arm, wherein the first cap creates a preset distance between the device and a workpiece; and
   a wheel positioned on the repositionable arm, wherein the wheel is rotatable about both the longitudinal axis and the second end.

2. The welding accessory device of claim 1 wherein said body portion is comprised of an inboard surface, an outboard surface and a continuous opening extending between said inboard surface and said outboard surface.

3. The welding accessory device of claim 2 wherein said body portion is further comprised of at least one side, a second continuous opening extending between said inboard surface and said outboard surface, and a slot extending between said continuous opening and said at least one side.

4. The welding accessory device of claim 3 wherein said slot also extends between said inboard surface and said outboard surface.

5. The welding accessory device of claim 1, wherein the block has a tapered portion that interacts with the wheel to permit the wheel to wobble as it rotates about the second end.

6. The welding accessory device of claim 2 further comprising a screw, wherein said continuous opening is adjustable in size by turning said screw.

7. The welding accessory device of claim 1, wherein the first end is approximately perpendicular to the second end.

8. The welding accessory device of claim 1, wherein the repositionable arm is further comprised of a series of caster like bends.

9. The welding accessory device of claim 1, wherein said device is rotatable 360 degrees about a welding head portion.

10. The welding accessory device of claim 1, wherein said wheel is positioned along and rotatable about said repositionable arm between said block and said second cap.

11. The welding accessory device of claim 3, wherein said repositionable arm is repositionable longitudinally and rotatably within said second continuous opening.

12. A welding accessory device comprising:
    a body portion comprised of a first continuous opening and a second continuous opening;
    a repositionable arm positioned in and rotatable within said second continuous opening, wherein said repositionable arm further comprises a ball bearing race and a series of caster like bends;
    a ball bearing;
    a tapered block, a first cap and a second cap, wherein the first cap and the second cap are each attached to an end portion of the repositionable arm, and further wherein the first cap creates a preset distance between the device and a workpiece; and
    a wheel attached to and rotatable about said repositionable arm.

13. The welding accessory device of claim 12 wherein said body portion further comprises a slot adjacent to said first continuous opening.

14. The welding accessory device of claim 13 further comprising a screw, wherein said first continuous opening and said slot are adjustable in size by turning said screw.

15. The welding accessory device of claim 12, wherein said device is rotatable 360 degrees about a welding head portion.

16. The welding accessory device of claim 12, wherein said wheel is positioned along said repositionable arm between said block and said second cap.

17. The welding accessory device of claim 12, wherein said repositionable arm is repositionable longitudinally and rotatably within said second continuous opening.

18. A welding accessory device comprising:
    a body portion;
    a repositionable arm comprised of a series of caster like bends and a ball bearing race;
    a ball bearing for interacting with the ball bearing race;
    a block having a tapered portion; and
    a wheel rotatable about the repositionable arm and positioned between the tapered portion of the block and a cap.

19. The welding accessory device of claim 18, wherein the repositionable arm is further comprised of a first end having a longitudinal axis.

20. The welding accessory device of claim 19, wherein the wheel has an orientation that is generally planar with the longitudinal axis.

* * * * *